3,243,453
SULPHONATION OF ALKYLBENZENES IN A
CONTINUOUS AND SUCCESSIVE MANNER
Mario Ballestra, Viale Bianca Maria 26, Milan, Italy
Filed Sept. 26, 1961, Ser. No. 140,782
Claims priority, application Italy, Oct. 5, 1960,
Patent 638,039
6 Claims. (Cl. 260—505)

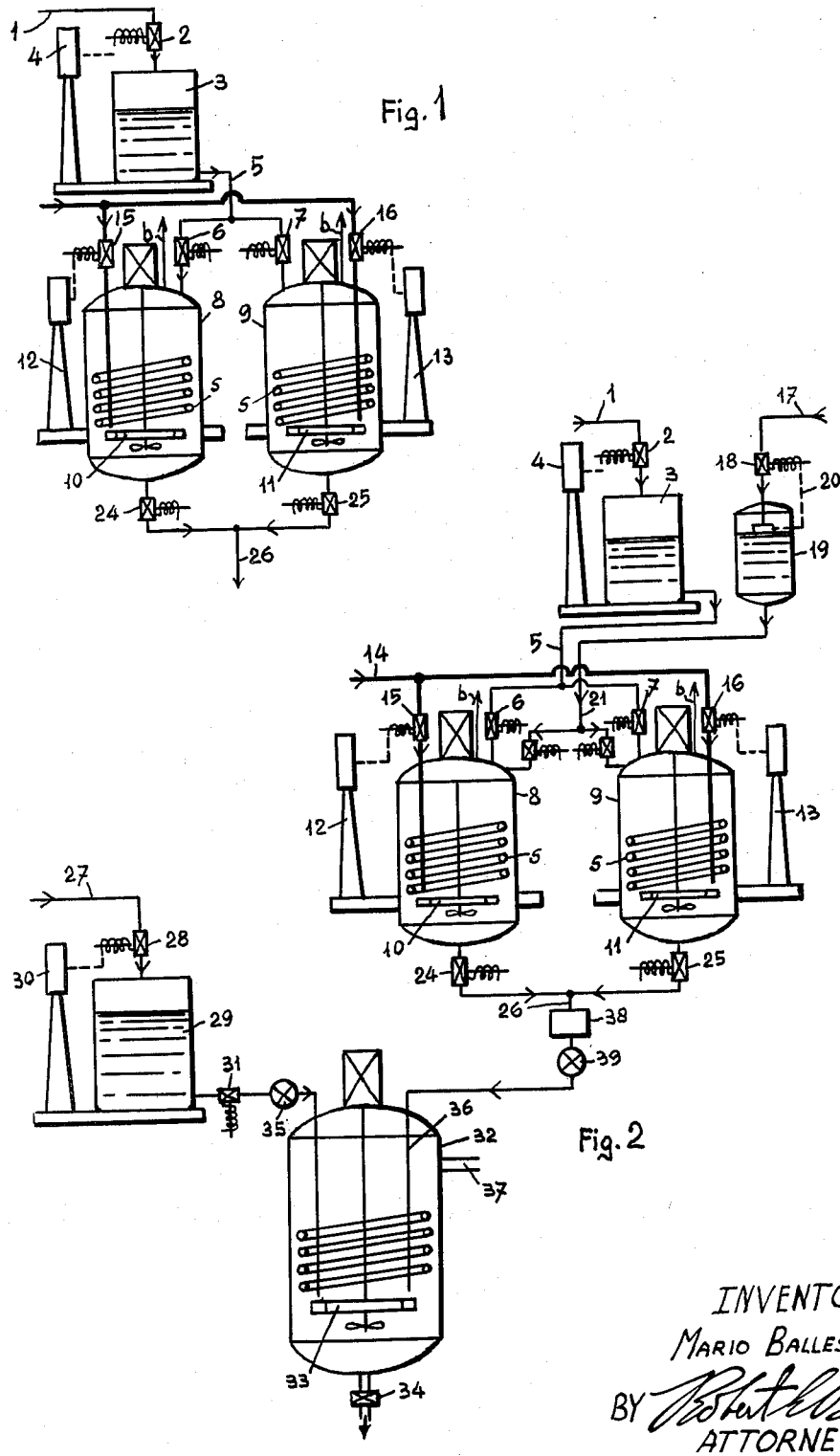

In the chemical industry it is often necessary to effect reactions in a non-continuous manner, because the nature of the reaction does not permit the use of means suitable to make it continuous.

In such cases it is very important to be in a position to proceed rapidly with the successive phases of reaction in order to use at the maximum the equipment, rendering the method practically continuous. But it is also necessary to contemporaneously remove the reaction product from the reactor only when it is certain that the reaction has been completely effected and thus that the reaction components have been completely reacted.

Among the various types of reaction comprised in the above case, there is the one in which reaction is effected between one or at least reagent in the gas or vapor phase, and the case in which the reaction product is composed of one or at least one component in the gas or vapor phase, which is gradually removed from the reactor.

The method according to the present invention, and the equipment by which it is realized, for the purpose of effecting reactions in a successive and automatic manner between at least two reagents, one of which is in the gas or vapor phase and is introduced gradually into a reaction container, and reactions producing reaction products of which one or at least one is in the gas or vapor phase and is gradually removed from the reaction container, are characterized by the fact that the discharging and/or the charging of the container are controlled by means sensitive to the change in weight which occurs in the container at the completion of the reaction.

The above method is particularly characterized by the fact that the reagent in the gas or vapor phase is fed into the reactor through an automatic valve controlled by a weighing device on which the reactor acts with its weight.

The above method is further characterized particularly by the fact that the weighing device is previously calibrated so that it may act on the valve controlling the flow of the reagent in the gas or vapor phase, as soon as the weight of the reactor and thus of the product contained therein, reaches the weight corresponding to that needed to show that the reaction has been completed.

The above method is also characterized by the fact that the weighing device is previously calibrated so that it may act on the discharge valve of the reactor as soon as the weight of the reactor and thus of the product contained therein reaches the weight corresponding to the product of the reaction being completely effected, with the removing of the gaseous product or products formed therein during the reaction.

The above method is further characterized by the fact that it takes place in at least two reactors, alternating with each other in their operation, so that the method may be realized in a continuous manner by alternating operations in the two reactors.

The above method, for its special application for effecting sulphonation reactions with gaseous sulphuric anhydride, is characterized by the fact that the latter is suitably mixed with a carrying gas containing little oxygen and small amounts of a gas with a reducing action.

The above method, for the last considered case, is characterized by the fact that the gas with a reducing action is sulphurous anhydride.

The above method is particularly further characterized by the fact that the mixture of the sulphonation gases containing sulphurous anhydride comes directly from the catalytic conversion of sulphurous anhydride into sulphuric anhydride.

In some cases the above method is characterized by the fact that the weighing device controlling the weight of the reaction container is calibrated so as to close the inlet valve of the reagent in the form of gas or vapor, as soon as the weight of the reaction container reaches the limit corresponding to the desired degree of reaction.

The equipment to carry out the above method is characterized by the fact that the reactor within which the reaction takes place is mounted on a means which is sensitive to the weight of the reactor and of the material contained therein, said means controlling according to said weight the inlet valve into the reactor for the reagent in the form of gas or vapor, or even one or more valves of the equipment.

The above equipment is then characterized by the fact that there are provided upstream of the reactor a container or containers for proportioning the reagent or the reagents to be fed into the reactor.

The above equipment is also, in one embodiment, characterized by the fact that it comprises at least two reactors each of them being fed with the reagents during the period of time when the reaction is effected in the other reactor or reactors, there being provided means to divert from one reactor to another the feed of the reagents, said means being actuated according to the weight of the reactor within which the reaction is taking place.

In the accompanying drawings there are shown by way of example only the diagrams of two equipment lay-outs, each of them comprising two reactors designed to work automatically, the alternating operations occurring alternatively and continuously; FIG. 1 relates to a general case and FIG. 2 to a particular case.

With particular reference to FIG. 1: 1 is the feeding pipe for the liquid reagent, 2 an electromagnetic valve controlling the inlet of liquid reagent into a feeding proportioning device 3; valve 2 is controlled by a weighing device 4 which is actuated by the weight of the proportioning device 3; 5 is the discharge pipe for the liquid reagent proportioned in the proportioning device 3 said pipe carrying alternatively the reactive to reactors 8 and 9; 6 and 7 are two time-controlled electromagnetic valves, arranged on the discharge pipe 5 for the liquid reagent proportioned in the device 3 in the reactors 8 and 9; these reactors are provided with a heating and/or cooling coil S. Within the containers 8 and 9 stirrers 10 and 11 are provided; 12 and 13 are scales or other weighing means controlling the weight of reactor 8 and 9; 14 is the feeding line for the reagent in the gas or vapor phase; 15 and 16 are electromagnetic valves controlling the inlet of the reagent in the gas or vapor phase into the reactors 8 and 9 and actuated by devices 12 and 13 which control the weight of the reactors 8 and 9; 24 and 25 are valves controlling the discharge of the two reactors 8 and 9; said valves may be time-controlled electromagnetic valves or they may also be controlled by the indications of the weighing devices 12 and 13; 26 is the discharge pipe for the reactors.

The operation of the equipment of FIG. 1 is as follows: from pipe 1 through valve 2 is introduced into the proportioning device 3 the predetermined amount of liquid reagent the weight of which is controlled by the scale 4 which, when the given weight is reached, automatically shuts the electromagnetic valve 2 A timer (which however could also be controlled by the scales 12 and 13) automatically opens valve 6 so that the reagent, through pipe 5, flows into reactor 8. The gaseous reagent is introduced from the bottom into the said reactor, near the stirrer 10, through pipe 14 and valve 15. The gaseous reagent reacts with the liquid reagent which increases in weight in proportion to the degree of reaction. When the reaction is completed, the charge in reactor 8 has reached a given weight, that is the weight corresponding to that of the product of reaction between the liquid and the gaseous reagents. When said weight is reached, the scale 12 will automatically shut valve 15. The reactor 8 will be then discharged and the product conveyed through valve 24 and conduit 26 to further treatment. There will then be started the charging of reactor 9 into which will be discharged the amount of liquid reagent previously proportioned in the proportioning device 3. The gaseous reagent will be introduced, through valve 16 into the second reaction container 9 until the weight of the reactor 9 reaches the weight corresponding to the final product.

The reaction may thus take place in a continuous manner alternatively in the two reactors.

It is obvious that the equipment could be provided with more of the reactors 8 and 9, as with more proportioning devices 3 for the case when more liquid reagents cooperate in the reaction.

Referring particularly to FIG. 2, in which have been kept as far as possible the same reference numerals as in FIG. 1, reference is made particularly to the case of a method of sulphonation of a material coming through valve 2. 17 is a water feeding pipe; 18 a valve controlling the inlet of the water into the feeding proportioning device 19 and is actuated by the feeding controlling device (siphon) 20, with which the proportioning device 19 is provided with; 21 is the discharge piping of the water proportioning device 19; 22 and 23 are time-controlled electromagnetic valves (or possibly even by the scales 12 and 13) for feeding water into the two reactors 8 and 9; 27 is an inlet pipe for the neutralization reagent; 28 is a valve controlling the inlet of the neutralization reagent into a proportioning device 29, said valve being actuated by a device (scale) 30 of the proportioning device 29; 31 is an electromagnetic valve controlling the inlet of the neutralizing reagent into the neutralization container 32 provided with a coil 36 and with an agitating device 33. The valve 31 may be actuated by a pH-meter which controls the pH within the neutralization container 32; 34 is a bottom discharge valve of the container 32 and 37 is a discharge pipe for overflow; 35 is a proportioning pump; 36 is a container for the product obtained in the reactors 8 and 9 and finally 39 is a proportioning pump; the discharge pipe 34 will be used for a not-continuous process, the overflow discharge pipe 37 for a continuous process.

The equipment according to FIG. 2 works as follows:

It is to be noted that the equipment shown in FIG. 2 is particularly suitable for sulphonation with sulphurous anhydride. The material to be sulphonated (alkylbenzene, alcohols, sulphonates, olefinic products and so on) is introduced through pipe 1 into the proportioning container 3 through valve 2 which closes automatically as soon as the weight controlled by the scale corresponds to the pre-established amount for the load of the first sulphonation container 8. The proportioned amount passes through pipe 5 and valve 6 for instance time-controlled into the first sulphonation device 8 provided with an agitating device 10. When the material to be sulphonated has been loaded, valve 6 is shut automatically (for instance by time control) and valve 15 opened for introducing the gaseous sulphonation agent. The gaseous sulphonation agent may be sulphuric anhydride evaporated and mixed with air so as to obtain a mixture containing about 4 to 8% of sulphuric anhydride. There are conveniently used mixtures of sulphuric anhydride and gas, with a content of oxygen lower than that of the air so as to prevent the sulphonated product from oxidizing and darkening. Small amounts of gaseous reducing agents, in particular sulphurous anhydride, may be also added.

A further advantage is obtained by using directly the gases of catalytic conversion from sulphurous anhydride to sulphuric anhydride, said gases being previously cooled. Such a gas has in fact a content of oxygen which is rather low and further contains small amounts of sulphurous anhydride acting as a reducer and thus as a bleaching agent of the product.

The mixture of gaseous sulphurous anhydride is introduced into the first sulphonation device 8 from the bottom near the agitating device 10. On the scale 12 is established the weight which the sulphonated product will have, so as to automatically stop the flow of the gaseous agent of sulphonation as soon as the said weight is reached.

For instance, while an alkylbenzene has a specific weight of about 870, an alkylbenzenesulphonic acid has a specific weight of about 1060, so that, when the weight corresponding to this specific weight is reached the scale automatically shuts the electromagnetic valve 15. When the sulphonation is ended, there is introduced into the sulphonation container 8 an amount of water prefixed and proportioned in the proportioning device controlled by the siphon 20 or by another device controlling the weight and the volume. Valve 22, which is for instance time controlled, introduces into the sulphonation device 8 the pre-fixed amount of water so as to complete the sulphonation reaction and to remove any sulphurous anhydride present in the sulphonated product, by changing it into sulphuric acid. Valve 24, which is for instance time controlled, is then open to discharge the sulphonated product into the container 32 for the neutralization.

While the above operation takes place within the sulphonation device 8, the proportioning device 3 charges the reactor 9 and, as soon as the reaction within the reactor 8 is ended, the valve 16, time-controlled or controlled by other automatic means or by the scale 12, is opened so that the reactions within the reactors 8 and 9 follow one another automatically and rapidly, using to the maximum the output of the equipment.

Into the container 32 from the pipe 26 through the vessel 38 and the proportioning pump 39 arrives the sulphonated product and from the pipe 27, through the proportioning device 29 mounted on the scale 30 controlling the inlet valve and through the valve 31 time-controlled or controlled by a pH-meter arrives the neutralization agent (sodium hydrate or other neutralizing agent).

The neutralization may take place in a non-continuous manner, by feeding the sulphonic acid through a direct connection (not shown in the figure) between the valve 24 and the neutralizing device 32, and by feeding the neutralizing agent directly from the proportioning device 29 and the valve 31, discharging the neutralizing agent directly from the proportioning device 29 and the valve 31 and discharging the neutralized product through the bottom valve 34. The neutralization may even be effected in a continuous manner by discharging the sulphonic acid into the lung 38 and feeding the neutralizing device 32 by means of a proportioning pump 30, while the neutralizing agent is fed to the neutralizing device through the proportioning pump 35 and the neutralized product is discharged from the neutralizing device 32 in a continuous way by overflow through the conduit 37.

Although for purposes of description, the present invention has been described on the ground of what is above stated, many changes, variations, additions and the like may be brought both to the method and to the equipment, as for instance by providing within the reactors 8 and 9 suitable breathers $b$ allowing the removal of the gas or gases and/or vapors developing during the reaction, or the excess of the gaseous reagent or reagents; however all of them being based on the main ideas of the invention as defined in the following claims.

What I claim is:

1. A process to effect sulphonation between a sulphonatable, liquid, alkylbenzene and a gaseous sulphonation reagent consisting of a mixture of sulphur trioxide, air, and a minor amount of sulphur dioxide to produce an alkylbenzenesulphonic acid having a specific gravity different from that of said gaseous reagent and said organic compound, which comprises introducing said organic compound into a reaction chamber to form a body of said organic compound therein, gradually introducing said gaseous reagent into the lower portion of said body of organic compound, allowing the gaseous products of said reaction and said gaseous reagent which has passed through said body of organic compound without reaction to escape from said reaction chamber, continuously weighing the contents of said reaction chamber, and automatically interrupting the introduction of said gaseous reagent into said body of organic compound when the weight of said contents reaches a predetermined value corresponding to a predetermined amount of reaction between said organic compound and said sulphonation reagent.

2. A method as defined in claim 1, wherein said gaseous reagent is a mixture of sulphonation gases containing sulphurous anhydride coming directly from the catalytic conversion from sulphurous anhydride into sulphuric anhydride.

3. A method as defined in claim 1, wherein the gaseous reagent is fed to said reaction chamber through an automatic valve controlled in response to said weight.

4. A method as defined in claim 3, wherein the valve is actuated to control the inlet of the gaseous reagent as soon as the weight of the contents reaches a weight corresponding to completion of the reaction.

5. A method as defined in claim 1, wherein said body is discharged from said reaction chamber as soon as said weight reaches a value corresponding to fully completed reaction, any gaseous product being removed from said reaction chamber during the reaction.

6. A method as defined in claim 1, further comprising a second reaction chamber adapted to be fed with said gaseous reagent when the supply of said gaseous reagent to said first-named reaction chamber is interrupted.

References Cited by the Examiner

UNITED STATES PATENTS

| | | | |
|---|---|---|---|
| 2,260,111 | 10/1941 | Caldwell | 23—263 |
| 2,353,505 | 7/1944 | Scheineman | 260—698 X |
| 2,419,470 | 4/1947 | Teter | 260—698 |
| 2,523,582 | 9/1950 | Mattson | 260—686 X |
| 2,613,218 | 10/1952 | Stoneman | 260—458 X |
| 2,632,766 | 3/1953 | De Benneville | 260—457 |
| 2,691,040 | 10/1954 | Bloch et al. | 260—459 X |
| 2,697,031 | 12/1954 | Hervert | 260—459 X |
| 2,703,788 | 3/1955 | Morrisroe | 260—686 X |
| 2,723,240 | 11/1955 | Baumgartner | 260—505 XR |
| 2,768,199 | 10/1956 | Luntz et al. | 260—505 |
| 2,802,026 | 8/1957 | Hennig et al. | 260—686 X |
| 2,810,746 | 10/1957 | Rueggeberg et al. | 260—686 X |
| 2,832,801 | 4/1958 | Bernstein | 260—505 |
| 2,845,455 | 7/1958 | Brown | 260—686 X |
| 2,863,737 | 12/1958 | Green | 23—263 |
| 2,865,958 | 12/1958 | Davies et al. | 260—698 X |
| 2,926,074 | 2/1960 | Berger | 23—263 |
| 2,970,165 | 1/1961 | Michel et al. | 260—457 |
| 3,002,818 | 10/1961 | Berger | 23—253 |
| 3,028,227 | 4/1962 | Ballestia | 23—285 |
| 3,056,831 | 10/1962 | Stratford | 260—686 X |

FOREIGN PATENTS 680,613    10/1952    Great Britain.

OTHER REFERENCES

Perry (editor), Chemical Engineers' Handbook, third ed., 1950, pp. 1293–4.

CHARLES B. PARKER, *Primary Examiner.*

LEON ZITVER, *Examiner.*

B. M. EISEN, F. D. HIGEL, *Assistant Examiners.*